US012812080B1

(12) United States Patent
Zhu

(10) Patent No.: US 12,812,080 B1
(45) Date of Patent: Nov. 24, 2026

(54) METHOD FOR TRANSMITTING VIDEO SIGNALS WITH ALPHA CHANNEL BASED ON HIGH-DEFINITION MULTIMEDIA INTERFACE, RECEIVING METHOD AND RELEVANT ELECTRONIC DEVICE

(71) Applicant: OSEE TECHNOLOGY LTD., Beijing (CN)

(72) Inventor: Liren Zhu, Beijing (CN)

(73) Assignee: OSEE TECHNOLOGY LTD., Beijing (CN)

( * ) Notice: Subject to any disclaimer, the term of this patent is extended or adjusted under 35 U.S.C. 154(b) by 15 days.

(21) Appl. No.: 19/459,146

(22) Filed: Jan. 26, 2026

(30) Foreign Application Priority Data

Dec. 16, 2025 (CN) ......................... 202511897600.7

(51) Int. Cl.
*H04N 11/20* (2006.01)
*H04N 7/01* (2006.01)

(52) U.S. Cl.
CPC ........... *H04N 11/20* (2013.01); *H04N 7/0125* (2013.01)

(58) Field of Classification Search
None
See application file for complete search history.

(56) References Cited

U.S. PATENT DOCUMENTS

2012/0307151 A1* 12/2012 Hunleth ................. H04N 9/641 348/554
2024/0223846 A1* 7/2024 Yang ........................ H04N 7/22

* cited by examiner

*Primary Examiner* — Stuart D Bennett
(74) *Attorney, Agent, or Firm* — Cooper Legal Group, LLC

(57) ABSTRACT

A method for transmitting a video signal with an Alpha channel based on a high-definition multimedia interface is applied to a sending-end electronic device and includes: obtaining to-be-transmitted video data that carries an RGB color signal and an Alpha channel signal; converting the RGB color signal into a YCbCr signal including 8-bit Y, 4-bit Cb and 4-bit Cr; filling the YCbCr signal and the Alpha channel signal respectively into dedicated carrying ranges of three R, G and B channels based on a preset mapping rule and a bit width requirement of 24 bits to generate to-be-sent data whose total single-frame data volume, resolution and timing are consistent with those of RGB 4:4:4 format; and implementing synchronous transmission of the to-be-transmitted video data via a single interface.

9 Claims, 5 Drawing Sheets

Basic formula for graphics signal keying: C = A*K + B*(1-K)

METHOD FOR TRANSMITTING VIDEO SIGNALS WITH ALPHA CHANNEL BASED ON HIGH-DEFINITION MULTIMEDIA INTERFACE, RECEIVING METHOD AND RELEVANT ELECTRONIC DEVICE

CROSS-REFERENCE TO RELATED APPLICATION

This application claims the priority to Chinese patent application serial no. 202511897600.7, filed on Dec. 16, 2025. The entirety of Chinese patent application serial no. 202511897600.7 is hereby incorporated by reference herein and made a part of this specification.

TECHNICAL FIELD

The present application relates to the technical field of digital video transmission, and in particular to a method for transmitting a video signal with an Alpha channel based on a high-definition multimedia interface, a receiving method and a relevant electronic device.

BACKGROUND ART

In the technical field of digital video transmission, video signals with an Alpha transparency channel constitute core technology for achieving multimedia presentation effects such as station logo overlay, subtitle display, lyric embedding, and graphics packaging, and are widely used in professional scenarios such as video production, live streaming, variety show and film broadcasting. Such video signals with an Alpha transparency channel are typically generated by a computer device, and need to be stably transmitted to professional video processing hardware for subsequent composition and output. HDMI (High-Definition Multimedia Interface) and DP (DisplayPort), as low-cost, highly compatible digital video transmission interfaces that are currently standard on computers and various display terminals, have become mainstream transmission links for cross-device high-definition video signal transmission in the industry due to their stable signal transmission capability and broad device compatibility. However, restricted by original standard definitions of the interfaces, a transmission format of an Alpha channel is not incorporated in official protocols of HDMI and DP, making integrated transmission of a video signal with an Alpha transparency channel difficult to achieve directly, bringing a technical obstacle to the construction of signal links in relevant multimedia scenarios.

To overcome the aforementioned transmission limitations, two categories of mainstream solutions have been developed in the industry. One category is to split the video signal with an Alpha channel into a standard video signal and an Alpha channel signal in black-and-white format via a dedicated board or device, and then transmit the signals respectively via two HDMI or DP interfaces, which requires dual interfaces at a receiving-end to accomplish signal integration. This solution not only requires additional procurement of high-priced dedicated hardware as well as supporting cables and power supplies, but also occupies a large number of interface resources of a receiving device, thereby substantially increasing system construction cost and wiring complexity. The other category is to adopt a non-standard signal format with a resolution 2 to 4 times an original resolution, and carry both the video signal and the Alpha channel in a single HDMI or DP interface. Although this solution reduces the number of interfaces, a transmission bandwidth requirement is significantly increased, and the non-standard resolution is prone to cause compatibility faults between devices and cannot be adapted to general transmission scenarios. Therefore, how to achieve stable and low-cost transmission of a video signal with an Alpha channel via a single interface without modifying a physical layer and a protocol layer of an HDMI or DP interface and without increasing the signal resolution and transmission bandwidth has become an urgent technical problem to be solved at present.

SUMMARY

The present application provides a method for transmitting a video signal with an Alpha channel based on a high-definition multimedia interface, a receiving method and a relevant electronic device, by means of which synchronous transmission of a video signal corresponding to an RGB color signal and a video signal corresponding to the Alpha channel can be achieved via a single interface without modifying a physical layer and a protocol layer of the high-definition multimedia interface, thereby not only saving additional procurement costs of dedicated hardware, but also conserving interface resources of a receiving device, while ensuring signal transmission compatibility and pixel synchronization precision.

In a first aspect, the present application provides a method for transmitting a video signal with an Alpha channel based on a high-definition multimedia interface, applied to a sending-end electronic device. The high-definition multimedia interface is a digital video interface that supports red-green-blue (RGB) 4:4:4 transmission protocol. The method includes the following steps:

- obtaining to-be-transmitted video data that carries an RGB color signal and an Alpha channel signal;
- converting the RGB color signal into a YCbCr-format video signal, wherein the YCbCr-format video signal includes an 8-bit luminance component Y, a 4-bit chrominance component Cb and a 4-bit chrominance component Cr;
- filling the YCbCr-format video signal and the Alpha channel signal respectively into RGB to-be-sent data (i.e., dedicated carrying ranges of three R, G and B color data channels (bit 0 to bit 7 of the R channel, bit 0 to bit 3 for Cb and bit 4 to bit 7 for Cr of the channel G, and bit 0 to bit 7 of the channel B)) corresponding to the RGB 4:4:4 transmission protocol, based on a pre-agreed mapping rule between the sending-end electronic device and a receiving-end electronic device, according to a signal bit width requirement of the RGB 4:4:4 transmission protocol of the high-definition multimedia interface, wherein a total single-frame data volume, a single-frame video resolution, and transmission timing specified by the RGB 4:4:4 transmission protocol, of the RGB to-be-sent data are consistent with a total single-frame data volume, a single-frame video resolution, and transmission timing specified by the RGB 4:4:4 transmission protocol of RGB 4:4:4 format; and
- transmitting the RGB to-be-sent data to the receiving-end electronic device via a single high-definition multimedia interface, so as to achieve synchronous transmission of the YCbCr-format video signal video signal and the Alpha channel signal carried in the RGB to-be-sent data.

This solution integrates the video signal and the Alpha channel signal into the dedicated ranges of the three channels of the RGB 4:4:4 protocol, thereby achieving synchronous transmission via a single high-definition multimedia interface without the need for additional interface expansion or protocol extension, and reducing hardware cost and compatibility risk. Meanwhile, the single-frame parameters and timing of the to-be-sent data are consistent with the protocol format, which ensures transmission compliance, avoids signal loss or distortion caused by format mismatch, and thus solves the problem that a traditional single interface has difficulty in synchronous transmission the video and Alpha channel signals.

In some implementations, converting the RGB color signal into a YCbCr-format video signal includes: converting the RGB color signal into a video signal in YCbCr 4:2:2 format.

This implementation adopts the YCbCr 4:2:2 format that is commonly used in the industry. The component bit width specification of 8-bit Y, 4-bit Cb and 4-bit Cr is compatible with bit width allocation for subsequent channel padding, without the need for additional bit width conversion processing, thereby simplifying a data processing procedure. Additionally, the YCbCr 4:2:2 format balances color restoration accuracy and data compression efficiency, thereby reducing transmission bandwidth pressure and improving overall transmission efficiency on the premise of ensuring video color quality.

In some implementations, the pre-agreed mapping rule between the sending-end electronic device and a receiving-end electronic device includes: based on an 8-bit channel bit order in which bit 0 is a least significant bit and bit 7 is a most significant bit, filling the 8-bit luminance component Y into a complete bit width range of bit 0 to bit 7 of an R channel, filling the 4-bit chrominance component Cr into a high-order bit width range of bit 4 to bit 7 of a G channel, filling the 4-bit chrominance component Cb into a low-order bit width range of bit 0 to bit 3 of the G channel, and filling the Alpha channel signal into a complete bit width range of bit 0 to bit 7 of a B channel, the filling ranges of the components have no bit width overlap, and the filling operations are performed only within corresponding dedicated carrying ranges.

By clarifying the channels and the bit mapping rule for the components, this implementation ensures no overlap or conflict in component filling, thereby avoiding interference between different signals. The 8-bit Y independently occupying the R channel ensures the integrity of a luminance signal. The high-order and low-order bits of the G channel respectively carrying Cb and Cr achieves efficient integration of chrominance signals. The Alpha signal independently occupying the B channel ensures no loss of transparency information, providing a clear technical basis for the receiving-end to accurately extract the components, and improving the accuracy of signal transmission.

In some implementations, a signal bit width of the RGB 4:4:4 transmission protocol of the high-definition multimedia interface is 24 bits, a total bit width of the dedicated carrying ranges is consistent with the 24-bit signal bit width, a total bit width of the YCbCr-format video signal is 16 bits and is jointly carried by a complete bit width range of the R channel and a complete bit width range of the G channel, an 8-bit width of the Alpha channel signal is independently carried by a complete bit width range of the B channel, and a bit width allocation of the components corresponds exactly to component extraction ranges preset at the receiving-end electronic device.

This implementation adapts to the bit width requirement of the RGB 4:4:4 protocol through precise allocation of the 24-bit total bit width (16-bit YCbCr+8-bit Alpha), without bit width redundancy or insufficiency. It also clarifies the correspondence between component bit widths and receiving-end extraction ranges, forming a technical closed loop of "transmission filling and reception extraction", thereby avoiding signal parsing errors caused by bit width mismatch, and ensuring the reliability and consistency of end-to-end transmission.

In a second aspect, the present application provides a receiving method for parsing a video signal with an Alpha channel based on a high-definition multimedia interface, applied to a receiving-end electronic device. The high-definition multimedia interface is a digital video interface that supports red-green-blue (RGB) 4:4:4 transmission protocol. The method includes the following steps:

- receiving the RGB to-be-sent data transmitted by a sending-end electronic device based on the method for transmitting a video signal with an Alpha channel based on a high-definition multimedia interface described in the first aspect or any possible implementation of the first aspect, via a single high-definition multimedia interface, according to transmission timing specified by the RGB 4:4:4 transmission protocol;
- respectively extracting a YCbCr-format video signal component and an Alpha channel signal component from three R, G and B color data channels of the RGB to-be-sent data, based on the pre-agreed mapping rule between the sending-end electronic device and the receiving-end electronic device, according to a 24-bit signal bit width requirement of the RGB 4:4:4 transmission protocol, under which each color data channel of the three R, G and B color data channels is allocated an 8-bit width;
- reconstructing the extracted YCbCr-format video signal component into a complete YCbCr-format video signal and converting the complete YCbCr-format video signal into the RGB color signal; and
- integrating the RGB color signal with the extracted Alpha channel signal component to generate target video data that carries the RGB color signal and the Alpha channel signal, wherein a total single-frame data volume and the single-frame video resolution of the target video data are consistent with the original to-be-transmitted video data of the sending-end electronic device.

In this solution, the signal components are accurately extracted from the three R, G and B channels based on the mapping rule matched with the sending-end, thereby achieving effective parsing of data transmitted through a single interface. Parameters of the target video data generated after color conversion and signal integration are consistent with those of the original data, which ensures no loss of video quality. This solves the problem that Alpha channel information is difficult to separate from a standard RGB 4:4:4 signal for a conventional receiving-end, and achieves complete restoration of video and transparency signals.

DETAILED DESCRIPTION

To make the objectives, technical solutions and advantages of the present application clearer, implementations of the present application will be further described in detail below in conjunction with the accompanying drawings.

It should be understood that the term "plurality" as referred to in the present application means two or more. In the description of the present application, the symbol "/" means "or", unless otherwise indicated. For example, A/B may indicate A or B. The expression "and/or" herein merely represents an association relationship describing associated objects, indicating there may be three relationships. For example, A and/or B may indicate three situations: A exists alone; both A and B exist; and B exists alone. In addition, to facilitate clearly describing the technical solutions of the present application, the terms "first", "second" and the like are used to distinguish between identical or similar items with substantially the same functions or effects. Those skilled in the art may understand that the terms "first", "second" and the like do not limit the number or the order of execution, and the terms "first", "second" and the like do not limit that the items are necessarily different.

Figure 1A:
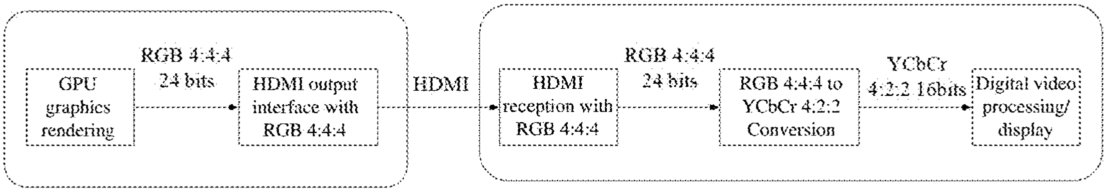
FIG. 1A is a schematic diagram of the principle that only an RGB video signal (without an Alpha channel) is transmitted via a single HDMI interface in the existing technology.

In the field of digital video transmission, especially in professional scenarios such as video production and live streaming, transmission of video signals with an Alpha channel is a core requirement for achieving effects such as high-quality graphic-text overlay and virtual studio production, and high-definition multimedia interfaces such as HDMI have become mainstream transmission carriers due to their low cost and strong compatibility. As shown in FIG. 1A, a conventional single HDMI interface in the existing technology supports only the transmission of RGB 4:4:4 video signals. After an RGB 4:4:4 signal generated by GPU rendering is sent through an HDMI interface, a receiving-end converts the signal into a signal in YCbCr 4:2:2 format for processing. The entire link is limited to carrying basic video color information, is completely unable to meet the transmission requirement of an Alpha channel, and cannot satisfy graphics keying applications in professional scenarios.

Figure 1B:
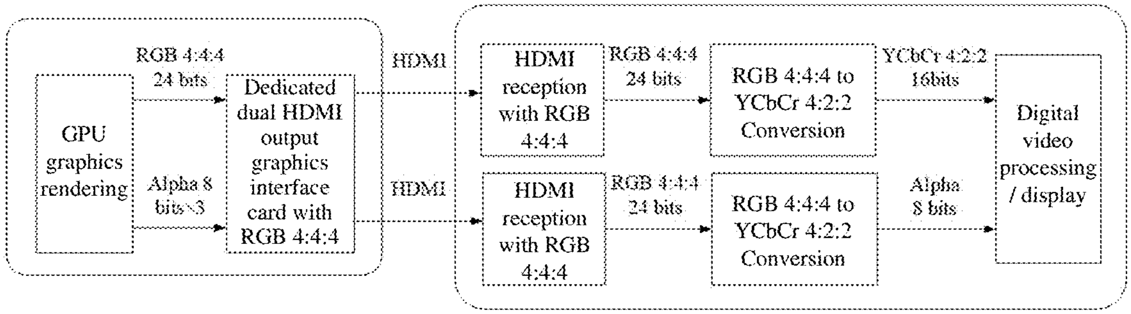
FIG. 1B is a schematic diagram of the principle that a video signal and an Alpha channel signal are respectively transmitted via dual HDMI interfaces in the existing technology.

In scenarios where a video and an Alpha channel need to be transmitted simultaneously, a dual-HDMI interface solution is adopted in the existing technology, but it has obvious defects. As shown in FIG. 1B, in this solution, by using a dedicated dual-HDMI output graphics interface card, an RGB 4:4:4 signal generated by a GPU and an Alpha signal are transmitted through two HDMI interfaces, and a receiving-end needs to be equipped with dual HDMI receiving modules for separate processing. This solution not only requires additional purchase of expensive dedicated hardware and occupies double interface resources of a receiving device, but also leads to reduced system stability due to multi-cable transmission, easily causing the problem of asynchronization between the video and the Alpha signal. A core reason for the defects of the existing solution is that the native protocol of the high-definition multimedia interface such as HDMI defines only transmission specifications for video color signals in RGB or YCbCr format and does not reserve any capacity for carrying an Alpha channel. The dedicated hardware solution compensates for the protocol defect through an extensive method of "adding a physical interface", but fails to address the essential issue at the level of interface protocol and data mapping.

In view of the numerous pain points in the existing technology, the present application proposes an innovative solution for transmitting a video signal with an Alpha channel based on a high-definition multimedia interface. In this solution, based on RGB 4:4:4 transmission protocol supported by an HDMI interface, an RGB color signal generated by a GPU is converted into YCbCr 4:2:2 format with 8-bit Y, 4-bit Cb and 4-bit Cr, then based on a preset mapping rule, the YCbCr components and an Alpha channel signal are accurately filled into dedicated bit width ranges of three R, G and B color data channels to generate to-be-sent data compliant with the RGB 4:4:4 protocol, and finally synchronous transmission of video and the Alpha signal is implemented via a single HDMI interface. This solution does not require additional hardware and bandwidth expansion, not only ensures complete compatibility with the existing interface protocol, but also achieves lossless transmission of the Alpha channel, thereby substantially reducing system cost, increasing transmission stability and signal synchronization, and providing an efficient and low-cost solution for professional scenarios such as video production and live streaming.

Figure 2:
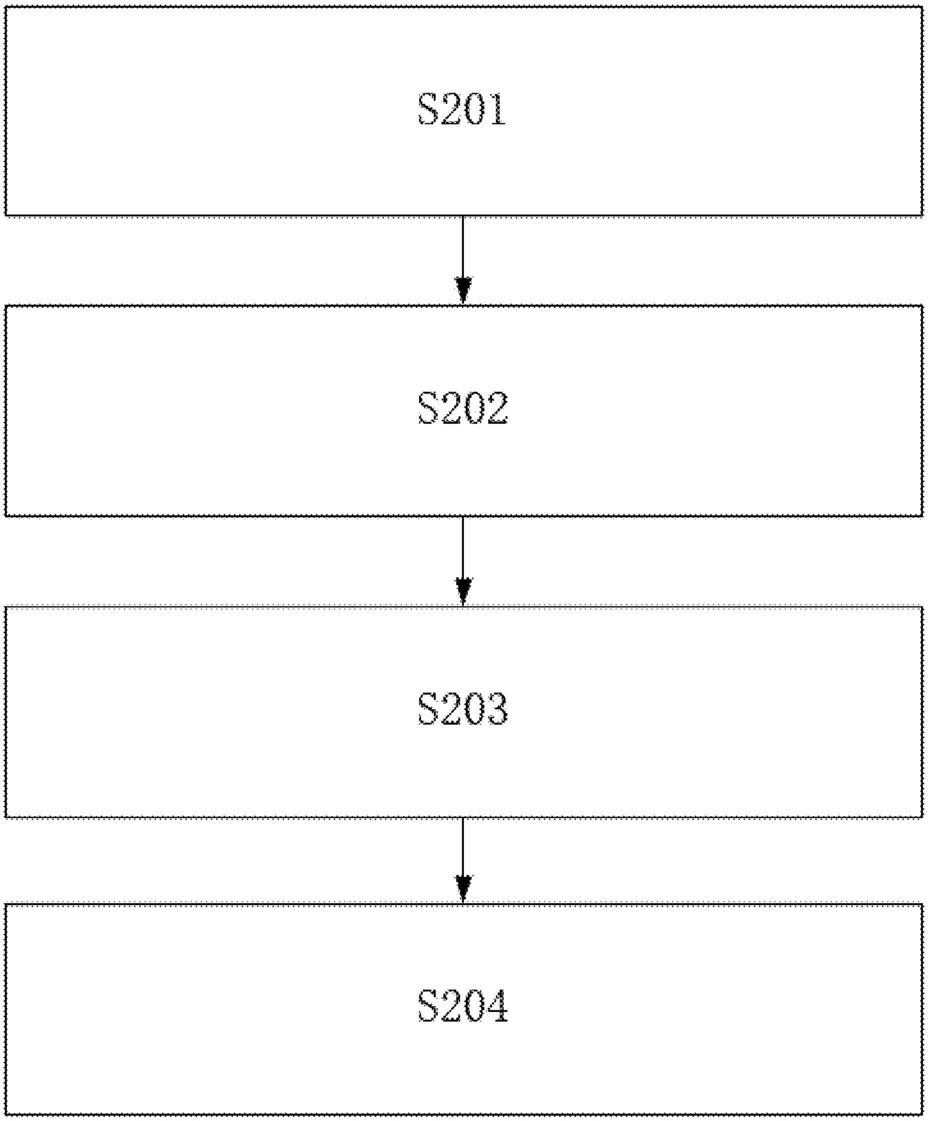
FIG. 2 is a schematic flow diagram of a method for transmitting a video signal with an Alpha channel based on a high-definition multimedia interface in an embodiment of the present application.

Embodiments of the present application will be introduced below in conjunction with the accompanying drawings. FIG. 2 shows a schematic flow diagram of a method for transmitting a video signal with an Alpha channel based on a high-definition multimedia interface in an embodiment of the present application. The method for transmitting a video signal with an Alpha channel based on a high-definition multimedia interface according to this embodiment is applied to a sending-end electronic device. The high-definition multimedia interface is a digital video interface that supports RGB 4:4:4 transmission protocol. As shown in FIG. 2, the method includes steps S201 through S204, detailed as follows:

S201: obtaining to-be-transmitted video data that carries an RGB color signal and an Alpha channel signal.

A to-be-transmitted YCbCr-format video signal and the Alpha channel signal may be generated by a GPU. The Alpha channel signal is a transparency control signal for implementing graphics overlay. For example, in a live streaming scenario, the Alpha channel may be used to distinguish an overlay area between a host's portrait and a virtual background.

It should be noted that the high-definition multimedia interface may specifically be an HDMI interface or a DisplayPort (DP) interface, both supporting the RGB 4:4:4 transmission protocol.

S202: converting the RGB color signal into a YCbCr-format video signal, wherein the YCbCr-format video signal includes an 8-bit luminance component Y, a 4-bit chrominance component Cb and a 4-bit chrominance component Cr.

In some possible implementations, converting the RGB color signal into a YCbCr-format video signal includes: converting the RGB color signal into a video signal in YCbCr 4:2:2 format.

In some possible implementations, an obtained YCbCr-format video signal is a combination of an 8-bit luminance component Y, a 4-bit chrominance component Cb and a 4-bit chrominance component Cr, and the Alpha channel signal is an 8-bit grayscale signal. Such a bit width configuration not only ensures color restoration accuracy of video, but also enables precise control of transparency levels, while avoiding excessive occupation of transmission bandwidth due to excessively high bit width.

S203: filling the YCbCr-format video signal and the Alpha channel signal respectively into RGB to-be-sent data corresponding to the RGB 4:4:4 transmission protocol, based on a pre-agreed mapping rule between the sending-end electronic device and a receiving-end electronic device, according to a signal bit width requirement of the RGB 4:4:4 transmission protocol of the high-definition multimedia interface, wherein a total single-frame data volume, a single-frame video resolution, and transmission timing specified by the RGB 4:4:4 transmission protocol, of the RGB to-be-sent data are consistent with a total single-frame data volume, a single-frame video resolution, and transmission timing specified by the RGB 4:4:4 transmission protocol of RGB 4:4:4 format. This process may refer to the signal mapping logic illustrated in FIGS. 4A and 4B.

It should be noted that filling respectively into RGB to-be-sent data corresponding to the RGB 4:4:4 transmission protocol means filling respectively into dedicated carrying ranges of three R, G and B color data channels corresponding to the RGB 4:4:4 transmission protocol to generate to-be-sent data compliant with the RGB 4:4:4 transmission protocol.

In some possible implementations, a signal bit width of the RGB 4:4:4 transmission protocol of the high-definition multimedia interface is 24 bits, and a total bit width of the dedicated carrying ranges is consistent with the 24-bit signal bit width, wherein a total bit width of the YCbCr-format video signal is 16 bits and is jointly carried by a complete bit width range of an R channel and a complete bit width range of a G channel, and an 8-bit width of the Alpha channel signal is independently carried by a complete bit width range of a B channel, and bit width allocation of the components corresponds exactly to component extraction ranges preset at a receiving-end.

The pre-agreed mapping rule between the sending-end electronic device and a receiving-end electronic device includes: based on an 8-bit channel bit order in which bit 0 is the least significant bit and bit 7 is the most significant bit, the 8-bit luminance component Y is filled into a complete bit width range of bit 0 to bit 7 of an R channel, the 4-bit chrominance component Cr is filled into a high-order bit width range of bit 4 to bit 7 of a G channel, the 4-bit chrominance component Cb is filled into a low-order bit width range of bit 0 to bit 3 of the G channel, and the 8-bit Alpha channel signal is filled into a complete bit width range of bit 0 to bit 7 of a B channel; and the filling ranges of the components have no bit width overlap, and the filling operations are performed only within corresponding dedicated carrying ranges. The mapping rule enables interference-free independent transmission of the signal components and ensures the accuracy of component extraction at the receiving-end.

Figure 4A:
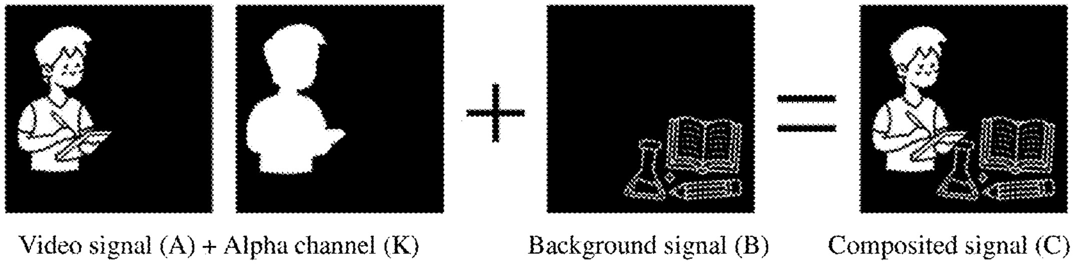
FIG. 4A is a schematic diagram of step-by-step processing of a video signal from an uncompressed original state, a compression processing stage to a stage of fusion with an Alpha channel signal in an embodiment of the present application.

Mapping of the YCbCr-format video signal and the Alpha channel signal to the three R, G and B color data channels corresponding to the RGB 4:4:4 transmission protocol is based on a preset bit width mapping rule, such that the 8-bit component Y is filled into a high-order 8 bits of the R channel, the 4-bit component Cr is filled into high-order 4 bits of the G channel, the 4-bit component Cb is filled into low-order 4 bits of the G channel, and the 8-bit Alpha channel signal is filled into high-order 8 bits of the B channel, thereby forming 24-bit data compliant with the RGB 4:4:4 protocol. For this process, reference may be made to signal mapping logic in FIG. 4A. FIG. 4A shows, on the left side, a video signal to be overlaid (A, a human image as an example) and a corresponding Alpha channel signal (K, represented by a grayscale image of a human silhouette, serving to define a transparency area of the image), and in the middle, a background signal (B, experimental equipment elements as an example); the video signal, the Alpha channel signal and the background signal are fused according to operational logic of the formula "C=A*K+B*(1−K)", and a composited signal (C) on the right side is finally obtained, which is an effect of natural overlay of the human image and the experimental equipment background, clearly demonstrating a core role of the Alpha channel in controlling image transparency and achieving precise overlay in a graphics keying scenario.

Figure 4B:
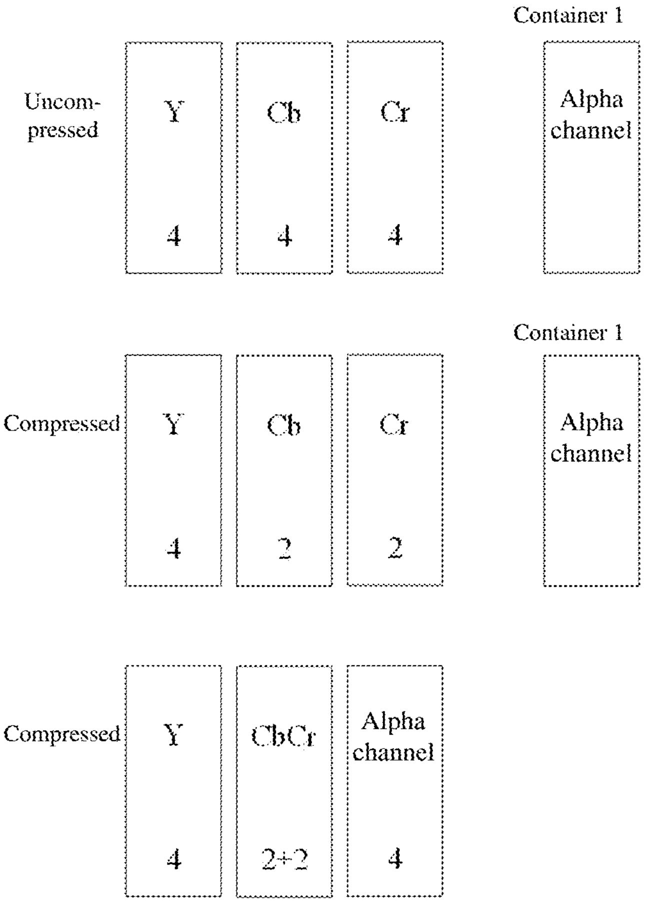
FIG. 4B is a schematic diagram of system architecture for transmitting a video signal with an Alpha channel based on a high-definition multimedia interface in an embodiment of the present application.

FIG. 4B illustrates the evolution of the signal-carrying scheme for the video signal components and the Alpha channel signal from an "uncompressed" state to a "compressed" state and then to a "fused" state. At the top is the uncompressed state in which each of the components Y, Cb and Cr occupies 4 units of resources, and the Alpha channel independently occupies a container, and the resources are scattered and the utilization rate thereof is low. In the middle is the compressed state in which the component Y is maintained at the 4 units, each of the components Cb and Cr is compressed to 2 units, and the Alpha channel still independently occupies the container. At the bottom is the compressed fused state in which on the basis that the component Y is maintained at the 4 units and each of the components Cb and Cr is compressed to the 2 units, Cb and Cr are merged into a container (4 units in total) while the Alpha channel signal is integrated into the same container set. This achieves resource multiplexing of the video components and the Alpha channel, and intuitively reflects optimization logic of the signal carrying modes evolving from dispersion to efficient integration.

In some possible implementations, an integrity check is performed on the YCbCr signal before mapping to ensure no data loss. This check step can effectively avoid subsequent mapping errors caused by signal damage and ensure the accuracy of transmitted data.

When the mapped data in RGB 4:4:4 format is sent through the high-definition multimedia interface that supports the RGB 4:4:4 transmission protocol, an HDMI 2.0 interface may be used as a transmission carrier. This interface supports a transmission bandwidth of 18 Gbps, and enables real-time transmission of video with an Alpha channel at 4K resolution. For the data sending process, reference may be made to a schematic diagram of a transmission link in FIG. 4C.

Figure 4C:
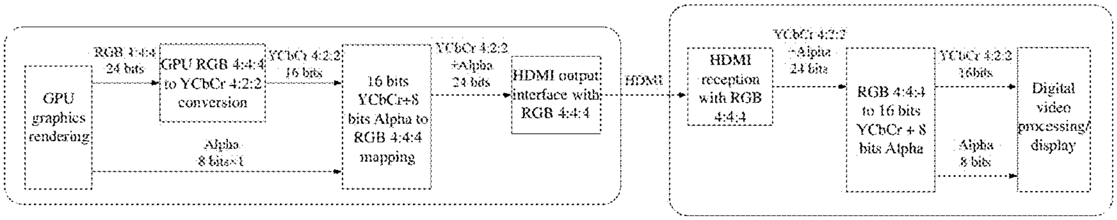
FIG. 4C is a schematic flow diagram of transmitting a video signal with an Alpha channel based on a high-definition multimedia interface in an embodiment of the present application.

FIG. 4C illustrates an end-to-end transmission process of a video signal with an Alpha channel based on an HDMI interface. At a sending end on the left side, a GPU first renders original 24-bit RGB 4:4:4 graphics into a 16-bit YCbCr 4:2:2 video signal and an 8-bit Alpha channel signal, which are then integrated into data in 24-bit RGB 4:4:4 format according to a 4:4:4 mapping rule, and the data is sent through an HDMI output interface. At a receiving-end on the right side, after the data is received through an HDMI interface, the data is first restored to the 24-bit RGB 4:4:4 format, and then separated into a 16-bit YCbCr 4:2:2 video signal and an 8-bit Alpha channel signal, which are finally provided for digital video processing and display. This fully illustrates an entire chain of "rendering-mapping-transmission-separation", and reflects technical logic of synchronous transmission of video and an Alpha channel signal through a single HDMI interface.

S204: transmitting the RGB to-be-sent data to the receiving-end electronic device via a single high-definition multimedia interface, so as to achieve synchronous transmission of the YCbCr-format video signal video signal and the Alpha channel signal carried in the RGB to-be-sent data.

As can be seen from FIG. 4C, this step achieves single-cable transmission of the video signal with the Alpha channel. At the sending-end, synchronous transmission of the video and the Alpha channel signal can be achieved through a single HDMI cable without additionally providing a physical interface, thus simplifying the transmission link.

In this embodiment, by mapping the YCbCr video signal and the Alpha channel signal to the RGB 4:4:4 format, single-cable transmission is achieved by means of the standard HDMI interface, thereby overcoming the drawback of traditional solutions requiring dual interfaces or dedicated hardware. This solution reduces equipment costs and link complexity, and can be widely applied to professional scenarios such as live streaming and virtual video production.

Figure 3:
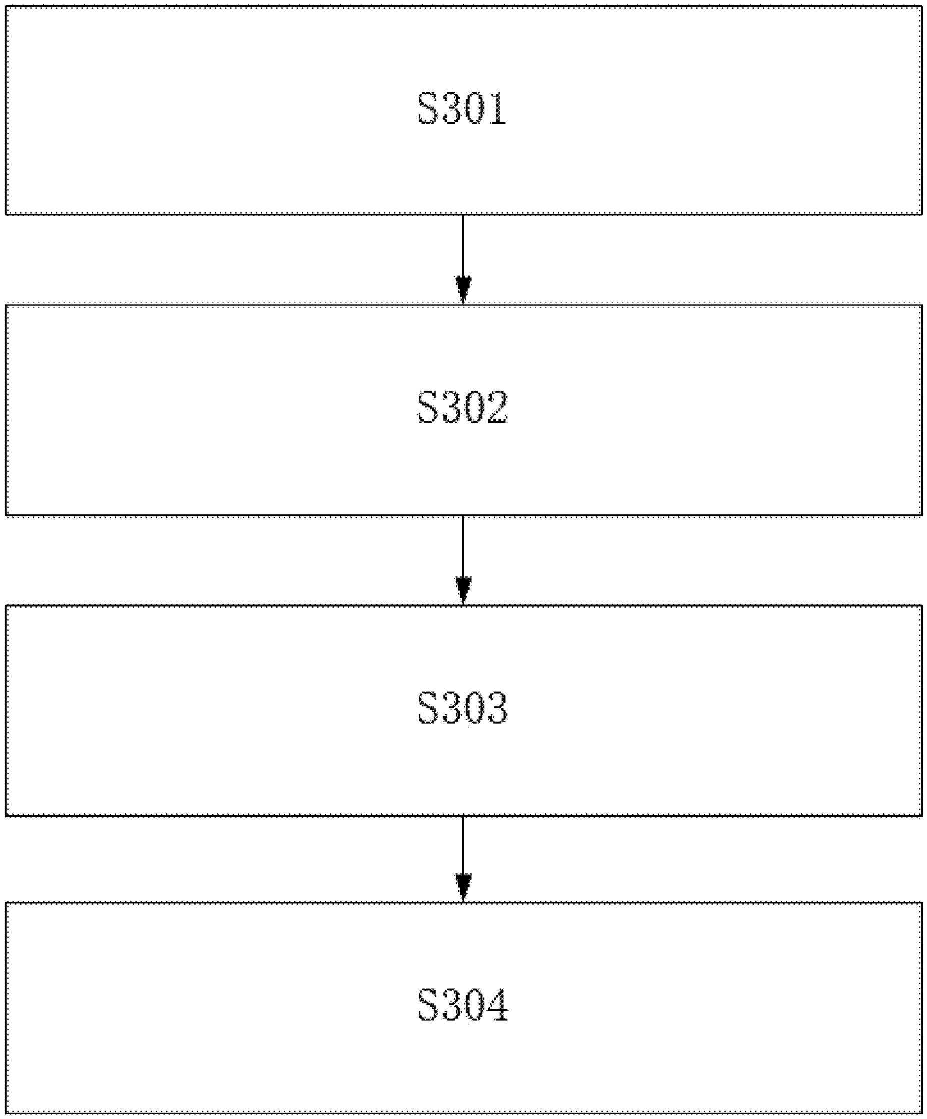
FIG. 3 is a schematic flow diagram of a receiving method for parsing a video signal with an Alpha channel based on a high-definition multimedia interface in an embodiment of the present application.

FIG. 3 is a schematic flow diagram of a receiving method for parsing a video signal with an Alpha channel based on a high-definition multimedia interface. The method for parsing a video signal with an Alpha channel based on a high-definition multimedia interface is applied to a receiving-end electronic device. The high-definition multimedia interface is a digital video interface that supports RGB 4:4:4 transmission protocol. The method includes steps S301 to S304 specifically as follows.

S301: receiving the RGB to-be-sent data transmitted by a sending-end electronic device based on the method shown in FIG. 2, via a single high-definition multimedia interface, according to transmission timing specified by the RGB 4:4:4 transmission protocol.

In some possible implementations, when receiving data in RGB 4:4:4 format transmitted via the high-definition multimedia interface, the receiving-end acquires, through an HDMI reception module, data in 24-bit RGB 4:4:4 format transmitted by a sending-end, while reading a synchronization check code in the data and confirming the integrity of a data frame.

S302: respectively extracting a YCbCr-format video signal component and an Alpha channel signal component from three R, G and B color data channels of the RGB to-be-sent data, based on the pre-agreed mapping rule between the sending-end electronic device and the receiving-end electronic device, according to a 24-bit signal bit width requirement of the RGB 4:4:4 transmission protocol, under which each color data channel of the three R, G and B color data channels is allocated an 8-bit width.

In some possible implementations, the pre-agreed mapping rule between the sending-end electronic device and the receiving-end electronic device includes: based on an 8-bit channel bit order in which bit 0 is the least significant bit and bit 7 is the most significant bit, a complete bit width range of bit 0 to bit 7 of the R channel, a high-order bit width range of bit 4 to bit 7 of the G channel, and a low-order bit width range of bit 0 to bit 3 of the G channel are defined as dedicated carrying ranges of the YCbCr-format video signal, and a complete bit width range of bit 0 to bit 7 of the B channel is defined as a dedicated carrying range of the Alpha channel signal; and the dedicated carrying ranges of the components have no bit width overlap, and the extraction operations are performed only within corresponding dedicated carrying ranges.

When the YCbCr component and the Alpha channel signal are extracted from data of the three R, G and B channels, reverse operations are performed according to the mapping rule of the sending-end: an 8-bit component Y is extracted from the R channel, a 4-bit component Cb and a 4-bit component Cr are extracted from the G channel, and the 8-bit Alpha channel signal is extracted from the B channel. For the extraction process, reference may be made to parsing logic in FIG. 4C.

S303: reconstructing the extracted YCbCr-format video signal component into a complete YCbCr-format video signal and converting the complete YCbCr-format video signal into the RGB color signal;

In some possible implementations, converting the YCbCr-format video signal into an RGB color signal includes: converting the YCbCr-format video signal into an RGB color signal according to a YCbCr-to-RGB color space conversion formula specified by Rec. 709 high-definition video standard, wherein value ranges of calculation results of R, G and B components in the conversion formula are 0 to 255 to match the 8-bit storage bit width of each of the three R, G and B channels, and input and output bit widths of the formula are consistent with specifications of an 8-bit luminance component Y and 4-bit chrominance components Cb and Cr, and a color conversion error meets a color restoration error threshold of high-definition video specified by the Rec. 709 standard. The conversion formula according to Rec. 709 high-definition video standard includes: $R=Y+1.402\ (Cr-128)$, $G=Y-0.34414\ (Cb-128)-0.71414\ (Cr-128)$, and $B=Y+1.772\ (Cb-128)$.

S304: integrating the RGB color signal with the extracted Alpha channel signal component to generate target video data that carries the RGB color signal and the Alpha channel signal, wherein the total single-frame data volume and a single-frame video resolution of the target video data are consistent with those of original to-be-transmitted video data of the sending-end electronic device.

In some possible implementations, for the three R, G and B color data channels of the to-be-sent data, a complete bit width range of bit 0 to bit 7 of the R channel, a high-order bit width range of bit 4 to bit 7 of the G channel, and a low-order bit width range of bit 0 to bit 3 of the G channel are jointly defined as dedicated carrying ranges of the 16-bit YCbCr-format video signal, and a complete bit width range of bit 0 to bit 7 of the B channel is independently defined as a dedicated carrying range of the 8-bit Alpha channel signal; and the complete bit width range of the R channel is exclusively used for carrying the luminance component Y, the high-order bit width range of bit 4 to bit 7 of the G channel is exclusively used for carrying the chrominance component Cr, and the low-order bit width range of bit 0 to bit 3 of the G channel is exclusively used for carrying the chrominance component Cb; and respectively extracting a YCbCr-format video signal component and an Alpha channel signal component includes: extracting the 8-bit luminance component Y from the complete bit width range of the R channel, extracting the 4-bit chrominance component Cr from the high-order bit width range of bit 4 to bit 7 of the G channel, and extracting the 4-bit chrominance component Cb from the low-order bit width range of bit 0 to bit 3 of the G channel, and combining the extracted components to form the 16-bit YCbCr-format video signal component; and extracting the 8-bit Alpha channel signal component from the complete bit width range of the B channel.

In this embodiment, accurate parsing of the video signal with the Alpha channel is achieved through reverse mapping, which is compatible with the transmission protocol of the sending-end and does not require additional hardware to be adapted. This ensures the integrity and overlay effect of the video image and is adaptable to various professional video processing scenarios.

Figure 5:
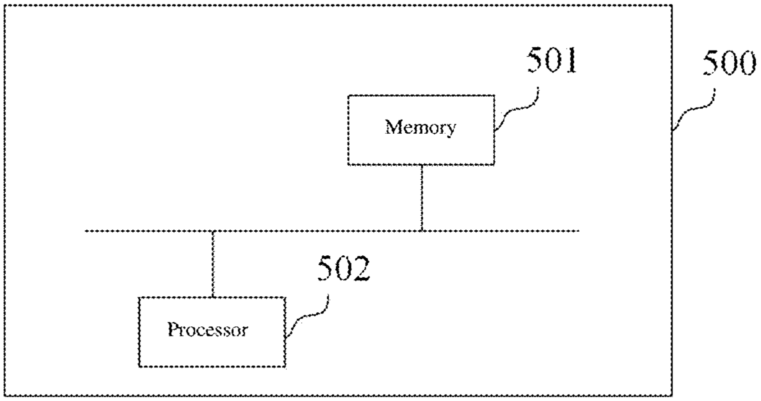
FIG. 5 is a schematic structural diagram of an electronic device according to an embodiment of the present application.

As shown in FIG. 5, an embodiment of the present application provides an optoelectronic device 500, as a sending-end electronic device, for achieving the method for transmitting a video signal with an Alpha channel based on a high-definition multimedia interface mentioned in the foregoing method embodiment. Hardware composition of the electronic device includes: a high-definition multimedia interface that supports RGB 4:4:4 transmission protocol, such as an HDMI 2.1 interface, which supports an ultra-high bandwidth of 48 Gbps and can meet the transmission requirement of video with an Alpha channel at 8K resolution; and a memory 501 and a processor 502. For example, the processor 502 may be a chip configured with ARM Cortex-A78 architecture and has a main frequency of 2.8 GHz, and can efficiently perform operations such as signal mapping, check and encapsulation; and the memory 501 may, for example, be configured to store a mapping rule, to-be-transmitted signal data and temporary operation files. When the processor 502 executes a computer executable instruction in the memory 501, the entire process of signal obtaining, mapping and sending can be performed sequentially, thereby achieving the function of single-cable transmission of a video signal with an Alpha channel.

Figure 6:
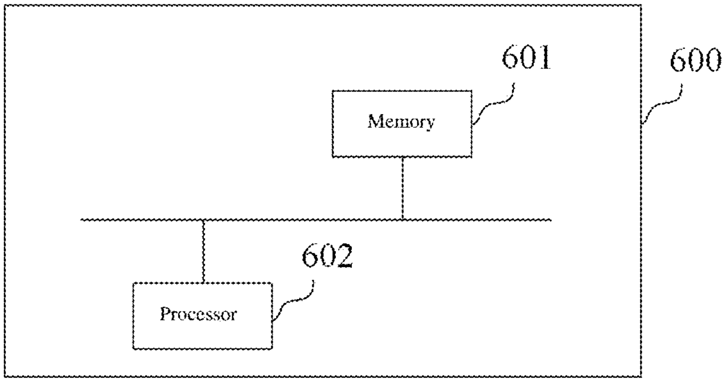
FIG. 6 is a schematic structural diagram of an electronic device according to an embodiment of the present application.

As shown in FIG. 6, an embodiment of the present application further provides an electronic device 600 as a receiving-end, for achieving the receiving method for parsing a video signal with an Alpha channel based on a high-definition multimedia interface in the foregoing method embodiment. The electronic device 600 includes: a high-definition multimedia interface that supports RGB 4:4:4 transmission protocol, such as an HDMI 2.1 reception module, which is compatible with the signal transmission protocol of a sending-end; and a memory 601 and a processor 602. The memory 601 is configured to cache received RGB 4:4:4 data and store parsing algorithm instructions. When the processor 602 executes a computer executable instruction in the memory 601, the entire process of signal reception, parsing, conversion and output can be performed, thereby achieving accurate restoration of a video signal with an Alpha channel.

Described above are optional embodiments of the present application, which are not intended to limit the present application, and any modifications, equivalent substitutions and improvements made within the disclosed technical scope of the present application should be encompassed within the protection scope of the present application.

What is claimed is:

1. A method for transmitting a video signal with an Alpha channel based on a high-definition multimedia interface, applied to a sending-end electronic device, wherein the high-definition multimedia interface is a digital video interface that supports red-green-blue (RGB) 4:4:4 transmission protocol, the method comprising:

obtaining to-be-transmitted video data that carries an RGB color signal and an Alpha channel signal;

converting the RGB color signal into a YCbCr-format video signal, wherein the YCbCr-format video signal comprises an 8-bit luminance component Y, a 4-bit chrominance component Cb and a 4-bit chrominance component Cr;

filling the YCbCr-format video signal and the Alpha channel signal respectively into RGB to-be-sent data corresponding to the RGB 4:4:4 transmission protocol based on a pre-agreed mapping rule between the sending-end electronic device and a receiving-end electronic device according to a signal bit width requirement of the RGB 4:4:4 transmission protocol of the high-definition multimedia interface, wherein a total single-frame data volume, a single-frame video resolution, and transmission timing specified by the RGB 4:4:4 transmission protocol, of the RGB to-be-sent data are consistent with a total single-frame data volume, a single-frame video resolution, and transmission timing specified by the RGB 4:4:4 transmission protocol of RGB 4:4:4 format; and transmitting the RGB to-be-sent data to the receiving-end electronic device via the high-definition multimedia interface to achieve synchronous transmission of the YCbCr-format video signal video signal and the Alpha channel signal carried in the RGB to-be-sent data, wherein the pre-agreed mapping rule between the sending-end electronic device and the receiving-end electronic device comprises:

based on an 8-bit channel bit order in which bit 0 is a least significant bit and bit 7 is a most significant bit, filling the 8-bit luminance component Y into a complete bit width range of bit 0 to bit 7 of an R channel, filling the 4-bit chrominance component Cr into a high-order bit width range of bit 4 to bit 7 of a G channel, filling the 4-bit chrominance component Cb into a low-order bit width range of bit 0 to bit 3 of the G channel, and filling the Alpha channel signal into a complete bit width range of bit 0 to bit 7 of a B channel, the filling ranges of the components have no bit width overlap, and the filling operations are performed only within corresponding dedicated carrying ranges.

2. The method for transmitting the video signal with the Alpha channel based on the high-definition multimedia interface according to claim 1, wherein converting the RGB color signal into the YCbCr-format video signal comprises:

converting the RGB color signal into a video signal in YCbCr 4:2:2 format.

3. The method for transmitting the video signal with the Alpha channel based on the high-definition multimedia interface according to claim 1, wherein a signal bit width of the RGB 4:4:4 transmission protocol of the high-definition multimedia interface is 24 bits, a total bit width of the dedicated carrying ranges is consistent with the 24-bit signal bit width, a total bit width of the YCbCr-format video signal is 16 bits and is jointly carried by the complete bit width range of the R channel and a complete bit width range of the G channel, an 8-bit width of the Alpha channel signal is independently carried by the complete bit width range of the B channel, and a bit width allocation of the components corresponds exactly to component extraction ranges preset at the receiving-end electronic device.

4. A receiving method for parsing a video signal with an Alpha channel based on a high-definition multimedia interface, applied to a receiving-end electronic device, wherein the high-definition multimedia interface is a digital video interface that supports red-green-blue (RGB) 4:4:4 transmission protocol, the method comprising:

receiving the RGB to-be-sent data transmitted by the sending-end electronic device based on the method of claim 1, via the high-definition multimedia interface, according to transmission timing specified by the RGB 4:4:4 transmission protocol;

respectively extracting a YCbCr-format video signal component and an Alpha channel signal component from the R channel, the G channel, and the B channel of the RGB to-be-sent data, based on the pre-agreed mapping rule between the sending-end electronic device and the receiving-end electronic device, according to a 24-bit signal bit width requirement of the RGB 4:4:4 transmission protocol, under which each color data channel of the R channel, the G channel, and the B channel is allocated an 8-bit width;

reconstructing the extracted YCbCr-format video signal component into a complete YCbCr-format video signal and converting the complete YCbCr-format video signal into the RGB color signal; and integrating the RGB color signal with the Alpha channel signal component to generate target video data that carries the RGB color signal and the Alpha channel signal, wherein the total single-frame data volume and the single-frame video resolution of the target video data are consistent with the original to-be-transmitted video data of the sending-end electronic device.

5. The receiving method for parsing the video signal with the Alpha channel based on the high-definition multimedia interface according to claim 4, wherein converting the complete YCbCr-format video signal into the RGB color signal comprises: converting the complete YCbCr-format video signal into the RGB color signal according to a YCbCr-to-RGB color space conversion formula specified by Rec. 709 high-definition video standard, value ranges of calculation results of R, G and B components in the YCbCr-to-RGB color space conversion formula are 0 to 255 to match an 8-bit storage bit width of each of the R channel, the G channel, and the B channel, the YCbCr-to-RGB color space conversion formula processes input data having bit-width specifications of: 8 bits for the 8-bit luminance component Y, and 4 bits for each of the 4-bit chrominance component Cb and the 4-bit chrominance component Cr, and produces RGB output data with a bit width of 8 bits per channel and a color conversion error meets a color restoration error threshold of high-definition video specified by the Rec. 709 high-definition video standard.

6. The receiving method for parsing the video signal with the Alpha channel based on the high-definition multimedia interface according to claim 5, wherein the pre-agreed mapping rule between the sending-end electronic device and the receiving-end electronic device comprises: based on the 8-bit channel bit order in which bit 0 is the least significant bit and bit 7 is the most significant bit, the complete bit width range of bit 0 to bit 7 of the R channel, the high-order bit width range of bit 4 to bit 7 of the G channel, and the low-order bit width range of bit 0 to bit 3 of the G channel are defined as dedicated carrying ranges of the YCbCr-format video signal, the complete bit width range of bit 0 to bit 7 of the B channel is defined as a dedicated carrying range of the Alpha channel signal, the dedicated carrying ranges of the components have no bit width overlap, and the extraction operations are performed only within corresponding dedicated carrying ranges.

7. The receiving method for parsing the video signal with the Alpha channel based on the high-definition multimedia interface according to claim 4, wherein for the R channel, the G channel, and the B channel of the to-be-sent data, the complete bit width range of bit 0 to bit 7 of the R channel, the high-order bit width range of bit 4 to bit 7 of the G channel, and the low-order bit width range of bit 0 to bit 3 of the G channel are jointly defined as dedicated carrying ranges of the YCbCr-format video signal, and the complete bit width range of bit 0 to bit 7 of the B channel is independently defined as a dedicated carrying range of the Alpha channel signal, the complete bit width range of the R channel is exclusively used for carrying the 8-bit luminance component Y, the high-order bit width range of bit 4 to bit 7 of the G channel is exclusively used for carrying the 4-bit chrominance component Cr, and the low-order bit width range of bit 0 to bit 3 of the G channel is exclusively used for carrying the 4-bit chrominance component Cb; and respectively extracting the YCbCr-format video signal component and the Alpha channel signal component comprises: extracting the 8-bit luminance component Y from the complete bit width range of the R channel, extracting the 4-bit chrominance component Cr from the high-order bit width range of bit 4 to bit 7 of the G channel, and extracting the 4-bit chrominance component Cb from the low-order bit width range of bit 0 to bit 3 of the G channel, combining the extracted components to form the YCbCr-format video signal component, and extracting the Alpha channel signal component from the complete bit width range of the B channel.

8. An electronic device, as a sending-end electronic device, comprising a high-definition multimedia interface that supports red-green-blue (RGB) 4:4:4 transmission protocol, a processor and a memory, wherein the processor is configured to execute a computer executable instruction, the memory is configured to store one or more computer executable instructions, and when the one or more computer executable instructions are executed by the processor, the method for transmitting the video signal with the Alpha channel based on the high-definition multimedia interface according to claim 1 is implemented.

9. An electronic device, as a receiving-end electronic device, comprising a high-definition multimedia interface that supports red-green-blue (RGB) 4:4:4 transmission protocol, a processor and a memory, wherein the processor is configured to execute a computer executable instruction, the memory is configured to store one or more computer executable instructions, and when the one or more computer executable instructions are executed by the processor, the receiving method for parsing the video signal with the Alpha channel based on the high-definition multimedia interface according to claim 4 is implemented.

* * * * *